J. F. O'CONNOR.
RESILIENT WHEEL.
APPLICATION FILED OCT. 9, 1914.
1,222,976. Patented Apr. 17, 1917.
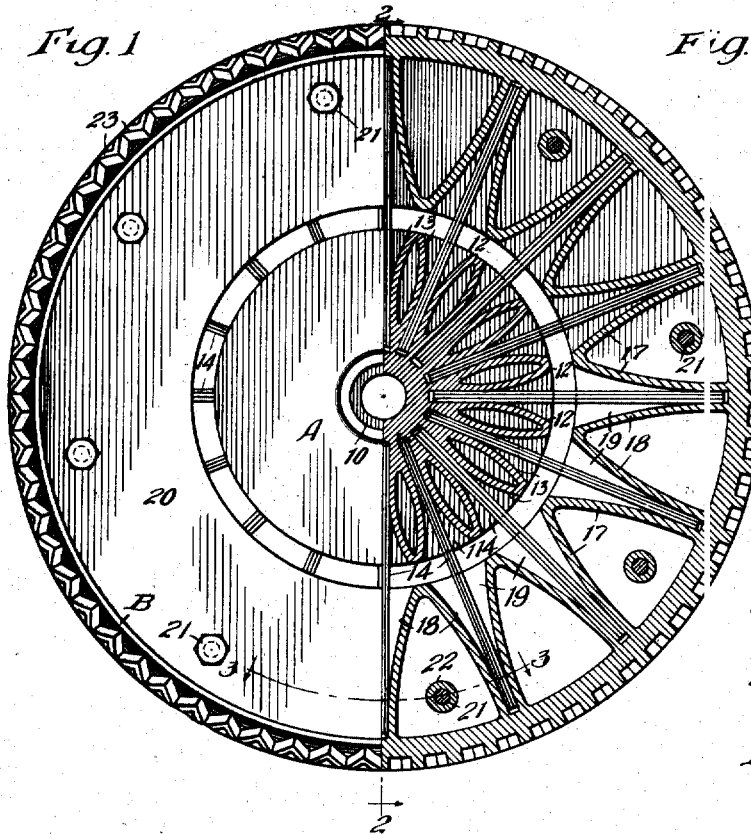
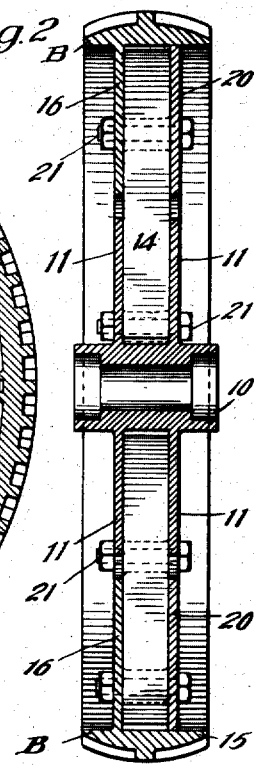
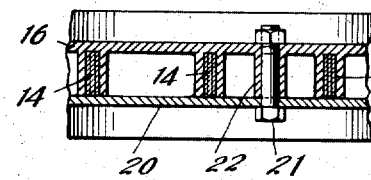
WITNESSES:
INVENTOR.
John F. O'Connor
BY George T. Haight
his ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

RESILIENT WHEEL.

1,222,976. Specification of Letters Patent. Patented Apr. 17, 1917.

Application filed October 9, 1914. Serial No. 865,810.

*To all whom it may concern:*

Be it known that I, JOHN F. O'CONNOR, a citizen of the United States, residing at Chicago, in the county of Cook and State of Illinois, have invented a certain new and useful Improvement in Resilient Wheels, of which the following is a full, clear, concise, and exact description, reference being had to the accompanying drawings, forming a part of this specification.

This invention relates to improvements in resilient wheels.

The object of the invention is to provide a resilient wheel suitable for automobiles or other vehicles which obviates the necessity of using pneumatic tires or cushioning means; one that may be manufactured at relatively small expense, and readily assembled; and one which will provide a satisfactory cushioning effect.

In the drawings forming a part of this specification, Figure 1 is a part side elevation, part sectional view of a wheel showing my improvements in connection therewith; Fig. 2 is a diametrical sectional view taken substantially on line 2—2 of Fig. 1; Fig. 3 is a sectional view taken substantially on arcuate line 3—3 of Fig. 1; and Fig. 4 is a detail view showing a portion of the tread of the wheel.

In said drawing, "A" denotes what I term the hub member, and "B" the rim member. As shown, the hub member A comprises a bored hub proper 10 to adapt the wheel to be mounted on an axle in the usual manner. The hub 10 is provided with a pair of spaced circular flanges 11—11 having extending therebetween, and preferably cast integral therewith, a series of radially arranged hollow bearing members 12—12, each of which bearing members 12 is provided with a pair of oppositely arranged convex surfaces 13—13, the members 12—12 being spaced to provide a plurality of radially arranged sockets 114, in which sockets are inserted a plurality of spokes, each of which is formed by a plurality of plate springs 14—14.

The rim member B comprises a rim proper 15 having cast integrally therewith an inwardly extending circular flange 16 and a plurality of hollow bearing members 17 corresponding in number and arrangement to the bearing members 12—12. Each of the spring bearing members 17—17 is also provided with a pair of oppositely disposed convex surfaces 18—18, and have formed therebetween radially arranged sockets 19—19 adapted to receive the outer ends of the spring plate spokes. The flange 16 is so arranged that it alines with one of the flanges 11, as clearly shown in Figs. 2 and 3, and the width of the bearing member 17 equals the distance between the flanges 11—11. A removable annular flange 20 is provided which corresponds to the flange 16, and is adapted to be secured thereto by a series of circumferentially arranged bolts 21 which pass through bushings 22 also cast integrally with the flange 16. (See Fig. 3.) The periphery of the rim 15 is substantially convex and is provided with a grip tread which consists of a connected series of diamond-shaped ribs 23, the major axes of the diamonds extending transverse to the periphery of the wheel.

As clearly shown in Figs. 1 and 2, the plate springs 14 which form the spokes of the wheel are shorter than the distance between the bottoms of the radial sockets in the hub and rim members so that the plate spring spokes may slide radially back and forth therein to a limited extent.

In assembling the wheel, the plate spring spokes are first inserted in the pockets in the hub member, after which the rim member is applied without the annular flange 20, and after the outer ends of the spring spokes have been inserted in the radial pockets 19, the plate 20 is secured in place by the bolts 21.

In operation, as will be apparent, there will be no forces applied to the vertical spokes when a load is applied, since the spokes are freely slidable up and down in their corresponding pockets. When the load is applied, the other spring spokes will be flexed slightly, those to the right of the central vertical plane in one direction, and those to the left in the other direction, and when so flexed the spring plates bear upon the convex surfaces 13 and 17 on opposite sides of the spokes, it being apparent that those spokes which are horizontal will be flexed more than those which more nearly approach the vertical. The yielding capacity of the wheel may be varied by varying the size and strength of the plates forming the spokes.

As will be understood by those skilled in the art, changes and modifications may be made in the details and arrangements of parts without departing from the spirit of the invention, and all such changes and modifications are contemplated as come within the scope of the claim appended hereto.

I claim:—

A resilient wheel of the character described comprising, a hub member having spaced circular flanges provided with a series of bearing members therebetween, said bearing members being radially arranged and each having oppositely disposed curved bearing surfaces and forming pockets therebetween, a cast rim member having a series of integral inwardly extending bearing members, each of which is provided with a pair of oppositely disposed curved bearing surfaces and forming pockets therebetween, and a series of spokes, each of which comprises a plurality of spring plates having the ends thereof loosely and radially slidably mounted in said pockets of the hub and rim members.

JOHN F. O'CONNOR.

Witnesses:
CARRIE G. RANZ,
LUCILLE HIGGINS.

Copies of this patent may be obtained for five cents each, by addressing the "Commissioner of Patents Washington, D. C."